US012608725B2

(12) United States Patent
Drerup et al.

(10) Patent No.: US 12,608,725 B2
(45) Date of Patent: Apr. 21, 2026

(54) DETERMINING USER ELIGIBILITY FOR CONTENT ITEM PRESENTATION BASED ON MULTIPLE OBJECTIVE-BASED METRICS

(71) Applicant: Maplebear Inc., San Francisco, CA (US)

(72) Inventors: Tilman Drerup, Palo Alto, CA (US); Levi Boxell, Brownsburg, IN (US); Rishikesh Yardi, Seattle, WA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/418,103

(22) Filed: Jan. 19, 2024

(65) Prior Publication Data

US 2025/0238837 A1     Jul. 24, 2025

(51) Int. Cl.
 *G06Q 30/0242*     (2023.01)
 *G06Q 30/0241*     (2023.01)
(52) U.S. Cl.
 CPC ..... *G06Q 30/0244* (2013.01); *G06Q 30/0277* (2013.01)
(58) Field of Classification Search
 CPC ........................ G06Q 30/0244; G06Q 30/0277
 See application file for complete search history.

(56) References Cited

U.S. PATENT DOCUMENTS

| | | | | |
|---|---|---|---|---|
| 9,367,524 | B1 * | 6/2016 | Filev | G06Q 30/0244 |
| 10,846,751 | B2 * | 11/2020 | Zhang | G06Q 30/0269 |
| 11,107,115 | B2 * | 8/2021 | Singhai | G06Q 30/0264 |
| 2009/0132340 | A1 * | 5/2009 | Demir | G06Q 30/02 |
| | | | | 705/7.29 |
| 2010/0017704 | A1 * | 1/2010 | Jaffe | G06Q 10/107 |
| | | | | 715/243 |
| 2011/0040617 | A1 * | 2/2011 | Moonka | G06Q 30/0277 |
| | | | | 705/14.69 |
| 2018/0121964 | A1 * | 5/2018 | Zhang | G06Q 30/0277 |
| 2019/0182059 | A1 * | 6/2019 | Abdou | H04L 51/52 |
| 2020/0042610 | A1 * | 2/2020 | Boles | G06Q 30/0244 |
| 2022/0129638 | A1 * | 4/2022 | Yang | G06F 40/205 |

(Continued)

OTHER PUBLICATIONS

Sengupta, Richik; Tensor networks in machine learning; Jul. 6, 2022; European Mathematical Society Magazine.*

(Continued)

*Primary Examiner* — Arthur Duran
(74) *Attorney, Agent, or Firm* — Fenwick & West LLP

(57) ABSTRACT

An online system sends content items for display to client devices associated with users and detects actions associated with the content items performed by the users. The system accesses and applies machine-learning models to predict metrics for a set of users and generates a set of optimal values for the set of users based on the metrics, one or more objectives, and a set of constraints, in which each optimal value indicates whether a user is eligible to be presented with a content item. Responsive to identifying an opportunity to present the content item to a user of the set of users, the system determines whether the user is eligible to be presented with the content item based on an optimal value determined for the user and sends the content item for display to a client device associated with the user if the user is eligible.

18 Claims, 6 Drawing Sheets

(56) References Cited

U.S. PATENT DOCUMENTS

| | | | | |
|---|---|---|---|---|
| 2022/0232342 A1* | 7/2022 | Pandey | .................... | G06N 3/04 |
| 2022/0295154 A1* | 9/2022 | Mo | .................. | H04N 21/26208 |
| 2022/0321955 A1* | 10/2022 | Hajiyev | ............ | H04N 21/8173 |
| 2022/0351252 A1* | 11/2022 | Gerber | .............. | G06Q 30/0277 |
| 2023/0012700 A1* | 1/2023 | Karlsson | ............ | G06Q 30/0201 |
| 2023/0072293 A1* | 3/2023 | Koh | .......................... | G06T 7/10 |
| 2023/0153700 A1* | 5/2023 | Lindgren | ........... | G06F 12/0875 |
| | | | | 706/12 |
| 2023/0177532 A1* | 6/2023 | Hajiyev | ............ | G06Q 30/0201 |
| | | | | 705/7.29 |
| 2023/0259717 A1* | 8/2023 | Dang | ................... | G06F 40/166 |
| | | | | 704/9 |
| 2023/0334338 A1* | 10/2023 | Moon | ..................... | G06N 5/02 |
| 2024/0256965 A1* | 8/2024 | Chung | ................. | G06N 20/00 |
| 2024/0330310 A1* | 10/2024 | Liu | .................. | G06F 16/24578 |

OTHER PUBLICATIONS

Mina A. Melek; Towards Intelligent Web Context-Based Content On-Demand Extraction Using Deep Learning; Dec. 12, 2020; IEEE.*

* cited by examiner

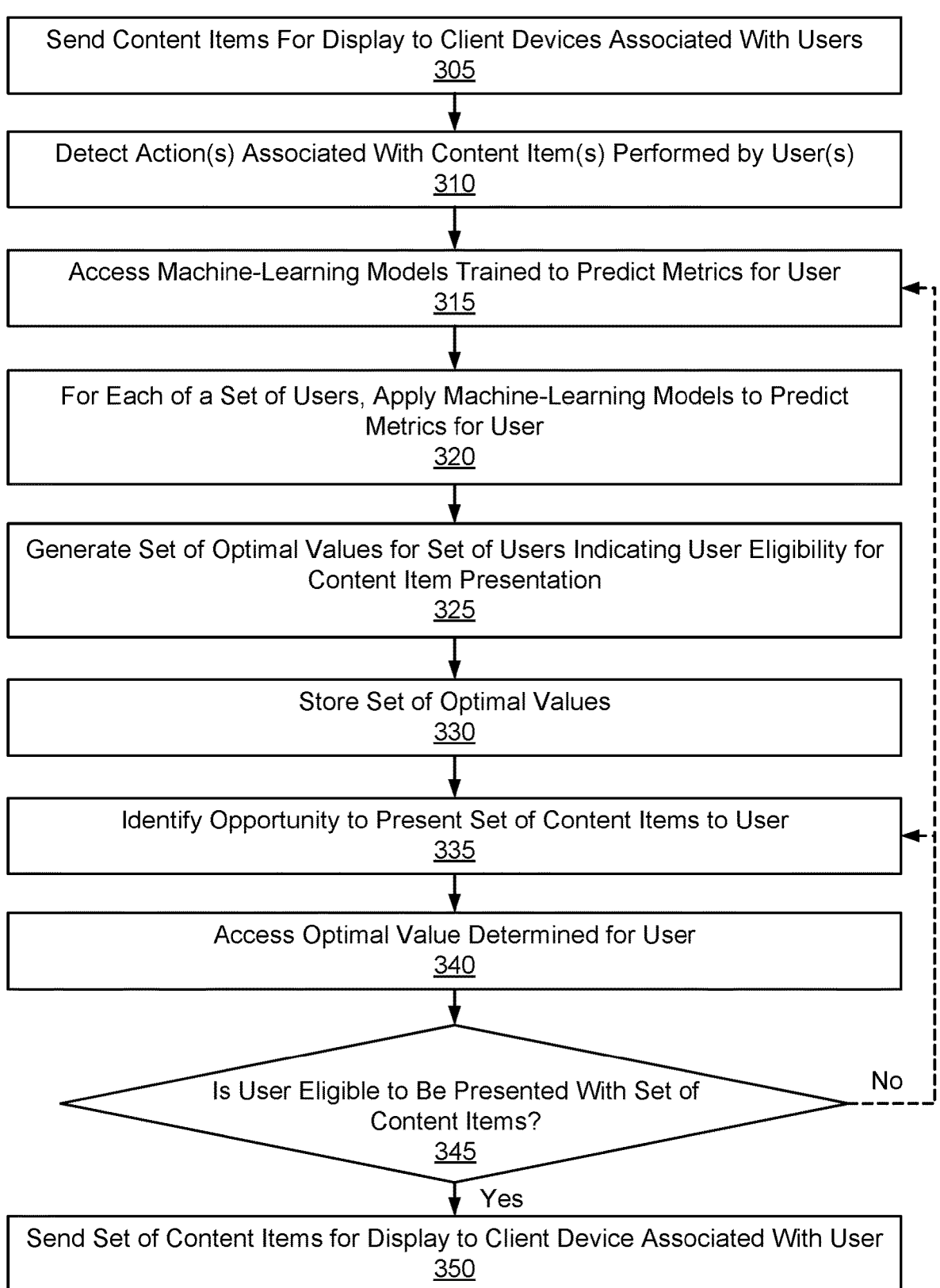

Send Content Items For Display to Client Devices Associated With Users
305

Detect Action(s) Associated With Content Item(s) Performed by User(s)
310

Access Machine-Learning Models Trained to Predict Metrics for User
315

For Each of a Set of Users, Apply Machine-Learning Models to Predict Metrics for User
320

Generate Set of Optimal Values for Set of Users Indicating User Eligibility for Content Item Presentation
325

Store Set of Optimal Values
330

Identify Opportunity to Present Set of Content Items to User
335

Access Optimal Value Determined for User
340

Is User Eligible to Be Presented With Set of Content Items?
345

No

Yes

Send Set of Content Items for Display to Client Device Associated With User
350

FIG. 3

| Users 505 | Optimal Value 510A |
|-----------|-------------------|
| User 505A | 1 |
| User 505B | 0 |
| User 505C | 0 |
| User 505D | 1 |
| ... | ... |

FIG. 5A

| Users 505 | Optimal Value 510B |
|---|---|
| User 505A | 0.94 |
| User 505B | 0.47 |
| User 505C | 0.45 |
| User 505D | 0.86 |
| ... | ... |

FIG. 5B

DETERMINING USER ELIGIBILITY FOR CONTENT ITEM PRESENTATION BASED ON MULTIPLE OBJECTIVE-BASED METRICS

BACKGROUND

Online systems, such as online concierge systems, social networking systems, video streaming systems, etc., may receive content items that are presented to their users. For example, an online system may present content items, such as advertisements, coupons, recipes, social media posts, etc. to its users that it receives from entities, such as other users, businesses, retailers, or organizations. Content items may be associated with items (e.g., goods or products) associated with the entities from which the content items are received. For example, an advertisement received from a business may promote a product sold by the business by encouraging a user of an online system to whom it is presented to order the product. Additionally, online systems may receive compensation in exchange for presenting content items to their users. In the above example, the online system may receive an amount of revenue from the business each time it presents the advertisement to a user or each time a user interacts with the advertisement.

However, the presentation of content items to online system users may have various consequences that negatively affect users, online systems, or entities from which the content items are received. For example, suppose that a video streaming system presents advertisements to its users while the users are streaming videos. In this example, while the video streaming system may receive an amount of revenue each time it presents an advertisement to a user, the users may reduce their engagement with the video streaming system or even stop using it altogether if they are constantly interrupted with advertisements when searching for or streaming videos. Alternatively, in the above example, if the users are presented with very few advertisements, while user retention may improve, entities from which the advertisements are received may be dissatisfied with the performance of the advertisements and may discontinue advertising via the video streaming system in the future, resulting in missed revenue opportunities for the video streaming system.

SUMMARY

To better understand the tradeoffs inherent in presenting content items to users in order to balance the interests of the users, online systems, and other entities, an online system determines user eligibility for content item presentation based on multiple objective-based metrics, in accordance with one or more aspects of the disclosure. More specifically, an online system sends content items for display to client devices associated with users of the online system and detects one or more actions associated with one or more of the content items, in which the one or more actions are performed by one or more of the users. The online system then accesses and applies machine-learning models to predict, for each of a set of users, metrics associated with objectives of the online system or an entity associated with a content item. The online system then generates a set of optimal values for the set of users based on the metrics, one or more of the objectives, and a set of constraints, in which each optimal value indicates whether a user is eligible to be presented with a set of content items. The online system then stores the set of optimal values. Responsive to identifying an opportunity to present the set of content items to a user of the set of users, the online system accesses an optimal value generated for the user and determines that the user is eligible to be presented with the set of content items based on the optimal value. Upon determining that the user is eligible to be presented with the set of content items, the online system sends the set of content items for display to a client device associated with the user.

BRIEF DESCRIPTION OF THE DRAWINGS

FIG. 3 is a flowchart of a method for determining user eligibility for content item presentation based on multiple objective-based metrics, in accordance with one or more embodiments.

FIGS. 5A and 5B illustrate examples of a set of optimal values indicating an eligibility of each of a set of users to be presented with a set of content items, in accordance with one or more embodiments.

DETAILED DESCRIPTION

Figure 1:
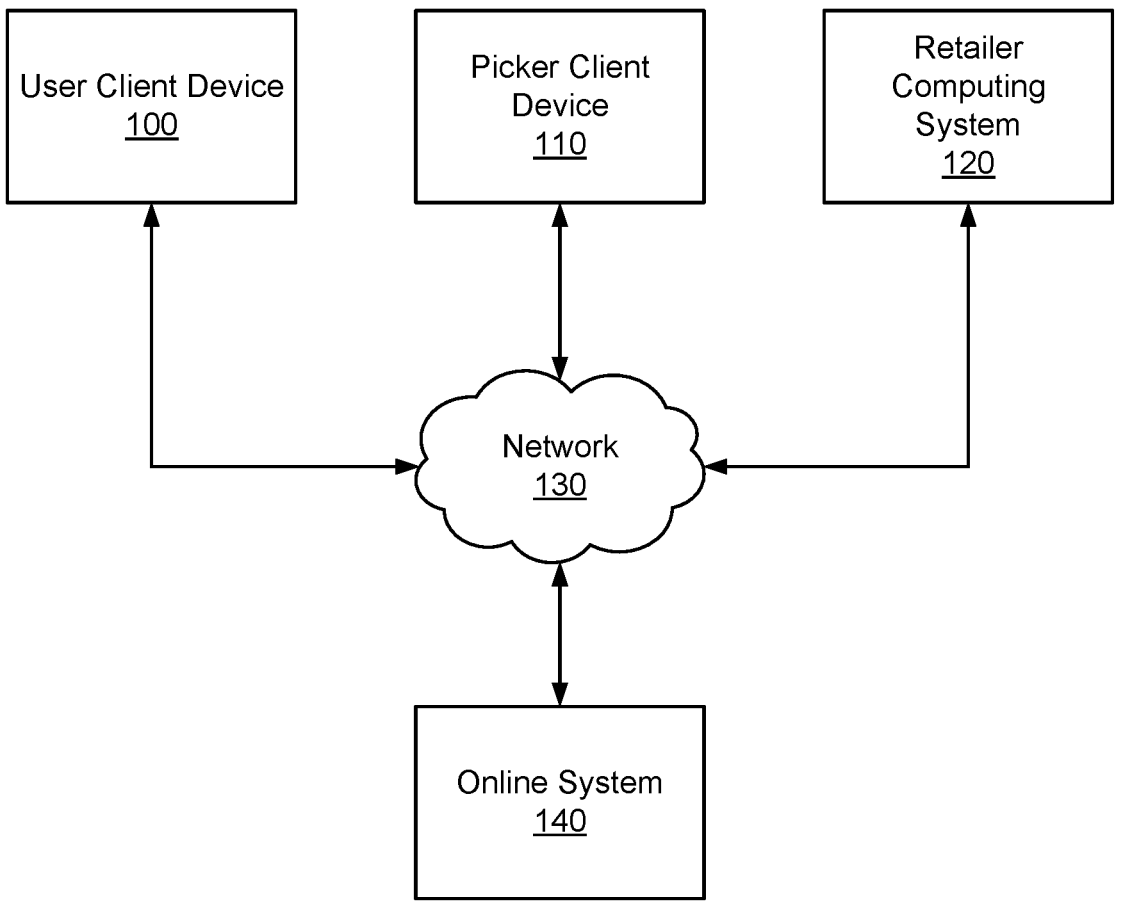
FIG. 1 illustrates an example system environment for an online system, in accordance with one or more embodiments.

FIG. 1 illustrates an example system environment for an online system 140, such as an online concierge system, in accordance with one or more embodiments. The system environment illustrated in FIG. 1 includes a user client device 100, a picker client device 110, a retailer computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1, any number of users, pickers, and retailers may interact with the online system 140. As such, there may be more than one user client device 100, picker client device 110, or retailer computing system 120.

The user client device 100 is a client device through which a user may interact with the picker client device 110, the retailer computing system 120, or the online system 140. The user client device 100 can be a personal or mobile computing device, such as a smartphone, a tablet, a laptop computer, or a desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, refers to a good or product that may be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the items should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer location. The picker client device 110 presents the items that are included in the user's order to the picker in a collection interface. The collection interface is a user interface that provides information to the picker identifying items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer location, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 provides instructions to a picker for delivering the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140. Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online system 140. As used herein, a "retailer" is an entity that operates a "retailer location," which is a store, warehouse, or other building from which a picker can collect items. The retailer computing system 120 stores and provides item data to the online system 140 and may regularly update the online system 140 with updated item data. For example, the retailer computing system 120 provides item data indicating which items are available at a particular retailer location and the quantities of those items. Additionally, the retailer computing system 120 may transmit updated item data to the online system 140 when an item is no longer available at the retailer location. Furthermore, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a user's order (e.g., as a commission).

The user client device 100, the picker client device 110, the retailer computing system 120, and the online system 140 may communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 may be an online concierge system by which users can order items to be provided to them by a picker from a retailer. The online system 140 receives orders from a user client device 100 through the network 130. The online system 140 selects a picker to service the user's order and transmits the order to a picker client device 110 associated with the picker. The picker collects the ordered items from a retailer location and delivers the ordered items to the user. The online system 140 may charge a user for the order and provide portions of the payment from the user to the picker and the retailer. As an example, the online system 140 may allow a user to order groceries from a grocery store retailer. The user's order may specify which groceries they want delivered from the grocery store and the quantities of each of the groceries. The user's client device 100 transmits the user's order to the online system 140 and the online system 140 selects a picker to travel to the grocery store retailer location to collect the groceries ordered by the user. Once the picker has collected the groceries ordered by the user, the picker delivers the groceries to a location transmitted to the picker client device 110 by the online system 140. In some embodiments, rather than an online concierge system, the online system 140 may be an online music or video streaming system, an online gaming system, a social networking system, or any other suitable type of online system. The online system 140 is described in further detail below with regards to FIG. 2.

Figure 2:
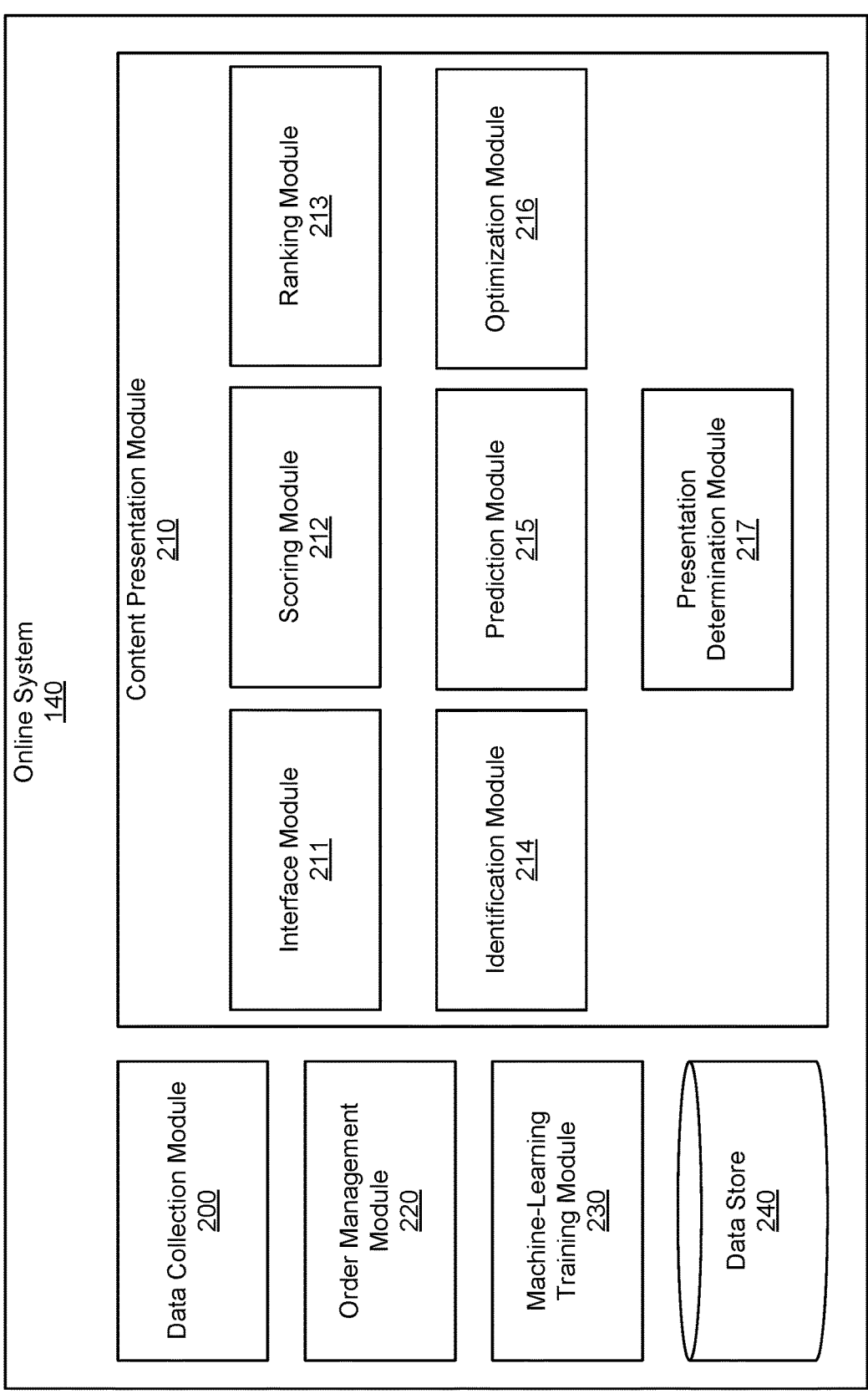
FIG. 2 illustrates an example system architecture for an online system, in accordance with one or more embodiments.

FIG. 2 illustrates an example system architecture for an online system 140, such as an online concierge system, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

The data collection module 200 collects user data, which is information or data describing characteristics of a user. User data may include a user's name, address, preferences (e.g., shopping preferences, dietary restrictions, favorite items, etc.), or stored payment instruments. User data also may include demographic information associated with a user (e.g., age, gender, geographical region, etc.) or household information associated with the user (e.g., a number of people in the user's household, whether the user's household includes children or pets, the user's household income, etc.). The user data also may include default settings established by the user, such as a default retailer/retailer location, payment instrument, delivery location, or delivery timeframe. Additionally, user data may include a set of optimal values generated for a set of users and a set of additional criteria indicating whether each user is eligible to be presented with a set of content items, as further described below.

User data also may include information describing sessions of users with the online system 140. Information describing a session of a user with the online system 140 may include one or more times (e.g., a start time and an end time) associated with the session, information describing content (e.g., images, videos, content items, etc.) sent to a user client device 100 associated with the user during the session, contextual information associated with the user during the session, or any other suitable types of information. Contextual information associated with a user may describe a context in which content items (e.g., advertisements, coupons, recipes, social media posts, etc.) or other types of content may be presented to the user. Contextual information associated with a user may include a page (e.g., a homepage or a checkout page), a surface (e.g., a set of search results, a set of browsing results, etc.), a presentation unit (e.g., a carousel or a slideshow), or any other suitable interface or element of an interface accessed by the user that may be used to present content to the user. Contextual information associated with a user also may include a time (e.g., a time of day, a day of the week, a holiday, a season, etc.) during which content may be presented to the user. Contextual information associated with a user also may include information describing a presence of one or more items in a list (e.g., a shopping list, a wish list, etc.) associated with the user, or any other suitable types of information associated with the user.

Additionally, user data may include information describing actions performed by users detected by the data collection module 200. User data may describe types of actions performed by a user (e.g., adding items to a shopping list, searching for or browsing items, clicking on content items, placing orders, purchasing items from retailer locations, etc.), times (e.g., timestamps or timespans) associated with the actions, as well as items, content items, interactive elements (e.g., scrollbars or buttons), etc. associated with the actions. For example, user data may include information describing orders placed by users with the online system 140, such as a number of items included in each order, an order in which items included in each order were added to a shopping list, whether each ordered item was associated with a discount or a coupon, whether each item ordered by a user is associated with a content item previously presented to the user, etc. As an additional example, user data may include information describing actions performed by a user associated with a content item, such as clicking on the content item, dismissing the content item (e.g., by closing or ignoring the content item), placing an order including an item associated with the content item, installing or downloading an application associated with the content item, or subscribing to a service associated with the content item. In this example, the user data also may describe a type of the content item (e.g., an advertisement, a coupon, a recipe, etc.) and items or other objects (e.g., videos, images, applications, etc.) associated with the content item, such as a type, a discount, a coupon, a price, etc. associated with each item/object. As yet another example, user data may describe items a user ordered within a threshold amount of time after being presented with or after clicking on content items associated with the items. User data also may describe values associated with actions performed by users (e.g., a quantity and a price of an item ordered by a user, a cost per click associated with a content item with which a user interacted, etc.) or any other suitable types of information describing actions performed by users.

User data also may include information that is derived from other user data. For example, suppose that user data describes previous orders placed by a user with the online system 140 or previous purchases made by the user at retailer locations. In the above example, based on the previous orders/purchases made by the user, the user data also may include a frequency with which the user orders or purchases items of a particular brand, a percentage of items the user orders/purchases that are on sale, and types of items that the user orders/purchases from a particular retailer. As an additional example, based on timestamps describing when a user accessed the online system 140, user data may include information describing the user's engagement with the online system 140 (e.g., on a monthly basis). The data collection module 200 may collect the user data from sensors on the user client device 100 or based on the user's interactions with the online system 140. The data collection module 200 also may collect the user data from one or more retailer computing systems 120, one or more third-party systems associated with one or more entities (e.g., a business, an organization, etc. from which a content item was received), or from any other suitable source.

The data collection module 200 also collects item data, which is information or data identifying and describing items that are available at a retailer location. The item data may include item identifiers for items that are available and may include quantities of items associated with each item identifier. Additionally, item data may also include attributes of items such as the sizes, colors, weights, stock keeping units (SKUs), serial numbers, prices, item categories, brands, qualities (e.g., freshness, ripeness, etc.), ingredients, materials, manufacturing locations, versions/varieties (e.g., flavors, low fat, gluten-free, organic, etc.), or any other suitable attributes of the items. The item data may further include purchasing rules associated with each item, if they exist. For example, age-restricted items such as alcohol and tobacco are flagged accordingly in the item data. Item data may also include information that is useful for predicting the availability of items at retailer locations. For example, for each item-retailer combination (a particular item at a particular retailer location), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or a user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects content item data, which may include content items that may be presented to users of the online system 140 and information or data describing characteristics of the content items. Content item data may include information describing a content item, such as a type of the content item (e.g., an advertisement, a recipe, a coupon, a social media post, etc.) and information describing items or other objects associated with the content item (e.g., information describing an item being advertised or a type of cuisine associated with a recipe). Furthermore, content item data may include targeting criteria describing users who may be eligible to be presented with a content item, such as demographic information, contextual information, historical order or purchase information, or any other suitable types of targeting criteria. Content item data may further include one or more values associated with a content item. For example, content item data associated with a content item corresponding to a coupon may include information describing one or more items to which the coupon may be applied and one or more quantities of the item(s) associated with the coupon (e.g., buy two, get one free) or an amount of a discount associated with the coupon (e.g., $1.00 off). As an additional example, content item data associated with a content item corresponding to an advertisement may include a cost per click or a cost per impression, a click-through rate, and a budget associated with the advertisement. In this example, the content item data also may include information describing a quantity of an item associated with the advertisement ordered by users of the online system 140 who were presented with the advertisement within a threshold amount of time prior to ordering the item. Content item data also may include information describing an entity (e.g., a brand, an organization, etc.), one or more topics, a campaign, a call to action, or any other suitable types of information associated with a content item. The data collection module 200 may collect content item data from one or more retailer computing systems 120, one or more third-party systems associated with one or more entities (e.g., a business, an organization, etc.), or from any other suitable source.

The data collection module 200 also collects picker data, which is information or data describing characteristics of pickers. For example, the picker data for a picker may include the picker's name, the picker's location, how often the picker has serviced orders for the online system 140, a user rating for the picker, the retailers from which the picker has collected items, or the picker's previous shopping history. Additionally, the picker data may include preferences expressed by the picker, such as their preferred retailers for collecting items, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data describing characteristics of an order. For example, order data may include item data for items that are included in the order, a delivery location for the order, a user associated with the order, a retailer location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

The content presentation module 210 selects content for presentation to a user. For example, the content presentation module 210 selects which items to present to a user while the user is placing an order. Components of the content presentation module 210 include: an interface module 211, a scoring module 212, a ranking module 213, an identification module 214, a prediction module 215, an optimization module 216, and a presentation determination module 217, which are further described below.

The interface module 211 generates and transmits an ordering interface for a user to order items. The interface module 211 populates the ordering interface with items that the user may select for adding to their order. In some embodiments, the interface module 211 presents a catalog of all items that are available to the user, which the user can browse to select items to order. Other components of the content presentation module 210 may identify items that the user is most likely to order and the interface module 211 may then present those items to the user. For example, the scoring module 212 may score items and the ranking module 213 may rank the items based on their scores. In this example, the identification module 214 may identify items with scores that exceed some threshold (e.g., the top n items or the p percentile of items) and the interface module 211 then displays the identified items. In some embodiments, the ordering interface or another type of interface generated and transmitted by the interface module 211 may include one or more content items, as further described below. In such embodiments, other components of the content presentation module 210 (e.g., the scoring module 212, the ranking module 213, and the identification module 214) may identify content items for presentation to a user and the interface module 211 may then send those content items for display to a user client device 100 associated with the user in a manner analogous to that described above.

The scoring module 212 may use an item selection model to score items or content items for presentation to a user. An item selection model is a machine-learning model that is trained to score items for a user based on item data for the items and user data for the user. For example, the item selection model may be trained to determine a likelihood that the user will order an item. In some embodiments, the item selection model uses item embeddings describing items and user embeddings describing users to score items. These item embeddings and user embeddings may be generated by separate machine-learning models and may be stored in the data store 240. The scoring module 212 also may score content items for presentation to a user in a manner analogous to that described above (e.g., using a machine-learning model trained to score content items for the user based on content item data for the content items and user data for the user, using content item embeddings describing the content items and a user embedding describing the user, etc.).

In some embodiments, the scoring module 212 scores items or content items based on a search query received from a user client device 100. A search query is free text for a word or set of words that indicate items of interest to a user. The scoring module 212 scores items based on a relatedness of the items to the search query. For example, the scoring module 212 may apply natural language processing (NLP) techniques to the text in the search query to generate a search query representation (e.g., an embedding) that represents characteristics of the search query. The scoring module 212 may use the search query representation to score candidate items for presentation to a user (e.g., by comparing a search query embedding to an item embedding). The scoring module 212 also may score content items based on a search query received from the user client device 100 in a manner analogous to that described above (e.g., based on a relatedness of the content items to the search query, using a search query representation to score candidate content items for presentation to a user by comparing a search query embedding to content item embeddings, etc.).

In some embodiments, the scoring module 212 scores items or content items based on a predicted availability of an item. The scoring module 212 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The scoring module 212 may apply a weight to the score for an item based on the predicted availability of the item. Alternatively, an item may be filtered out from presentation to a user by the identification module 214 based on whether the predicted availability of the item exceeds a threshold. The scoring module 212 also may score a content item based on a predicted availability of an item associated with the content item in a manner analogous to that described above (e.g., using an availability model, applying a weight to a score for the content item based on the predicted availability, etc.). The identification module 214 also may filter a content item out from presentation to a user based on whether a predicted availability of an item associated with the content item exceeds a threshold.

The prediction module 215 predicts various metrics for a user of the online system 140 for a future time period (e.g., for the next 28 days, year, five years, etc.) and a content item load for the user. A content item load for a user may describe a quantity of content items that may be presented to the user (e.g., per surface or page) or a frequency with which content items may be presented to the user. For example, a content item load for a user may correspond to never, once per minute, twice per page, etc. A content item load for a user may be determined (e.g., using a machine-learning model) each time the presentation determination module 217 (described below) identifies an opportunity to present a set of content items to the user. Alternatively, a content item load for a user may be determined on a different basis (e.g., daily) and stored in the data store 240 on the same or a similar basis. The metrics may be associated with objectives of the online system 140 or an entity associated with a content item, such as a retailer, a business, or an organization from which the content item was received. Furthermore, the metrics may describe a growth of the online system 140, user satisfaction with the online system 140, user retention, an amount of revenue earned by the online system 140, an amount of revenue earned by an entity (e.g., attributed or incremental ads sales), or any other suitable types of information. For example, the prediction module 215 may predict various metrics for a user for a future time period (e.g., the next year) and a content item load for the user describing a quantity of content items that may be presented to the user or a frequency with which content items may be presented to the user (e.g., a rate of once every five minutes). In this example, the metrics may be associated with one or more objectives of the online system 140 (e.g., maximizing growth of the online system 140, maximizing user satisfaction with the online system 140, etc.) and may include proxies for growth of the online system 140 (e.g., a net present value, a gross transaction volume, or a monthly engagement for the user). Continuing with this example, the metrics also may be associated with a revenue-based objective of an entity and may include an amount of revenue earned by the entity from orders or purchases of items associated with the entity by the user. In the above example, the metrics further may be associated with a revenue-based objective of the online system 140 and may include an amount of revenue earned by the online system 140 from presenting content items to the user (e.g., based on a cost per click or a cost per impression associated with each content item, from commissions for items associated with the content items ordered or purchased by the user, etc.).

The prediction module 215 may predict metrics for a user based on various types of information, such as a set of user data associated with the user, a future time period for which the metrics are to be predicted, or any other suitable types of information. Furthermore, the set of user data associated with the user may include a content item load for the user, contextual information associated with the user, or any other suitable types of user data. For example, suppose that user data associated with users include a content item load for each user describing a quantity of content items that were sent to a user client device 100 associated with each user or a frequency with which content items were sent to a user client device 100 associated with each user (e.g., never, once per minute, once per set of search results, etc.). In the above example, suppose also that user data associated with the users include contextual information associated with each user when the content items were sent to a user client device 100 associated with each user (e.g., a time of day, a set of surfaces or pages accessed by the user, a set of items included in a shopping list associated with the user, etc.). In this example, suppose also that the user data include demographic information associated with each user and information describing actions performed by each user (e.g., adding items to a shopping list, searching for items, browsing items, placing orders with the online system 140, etc.). Continuing with this example, via extrapolation, the prediction module 215 may predict metrics for a user for a future time period and a content item load for the user (e.g., a number of content items presented per set of search results). In this example, the prediction module 215 may predict the metrics based on a set of the user data associated with a set of users having at least a threshold measure of similarity to the user (e.g., similar preferences and demographic information), in which the set of users were associated with the same or a similar content item load. In the above example, the metrics may include a net present value, a gross transaction volume, a monthly engagement by the user with the online system 140, etc.

The prediction module 215 also may predict metrics for a user based on additional types of information, such as a set of content item data associated with content items that may be presented to the user or any other suitable types of information. In the above example, suppose also that content item data associated with content items describe targeting criteria associated with each content item, a value associated with each content item, such as a cost per click, a cost per impression, a click-through rate, or a budget associated with the content item, or a quantity of an item associated with the content item ordered by users presented with the content item within a threshold amount of time before ordering the item. Continuing with this example, via extrapolation, the prediction module 215 also may predict additional metrics for the user for the future time period and the content item load for the user based on a set of the content item data. In the above example, the set of content item data may be associated with a set of content items having targeting criteria satisfied by the user, in which the set of content items were presented to the set of users having at least a threshold measure of similarity to the user (e.g., similar preferences and demographic information) and the set of users were associated with the same or a similar content item load. In the above example, the additional metrics may include an amount of revenue earned by the online system 140 or by an entity associated with the set of content items.

The prediction module 215 also may determine a predicted effect of different content item loads for a user (e.g., presenting different quantities of content items to the user or presenting content items to the user with different frequencies) on a metric for a future time period. The prediction module 215 may do so by computing a difference between values of the metric predicted for the user for the future time period. For example, suppose that, at the level of individual users (indicated by the subscript i), the prediction module 215 has predicted a first net present value ($NPV_i$) for a user associated with user data ($X_i$), such as demographic information, contextual information, etc., for the next 28 days and a content item load (t) for the user that is at least a threshold (e.g., at least three content items per set of search results). In this example, suppose that the prediction module 215 has also predicted a second net present value (NPV$_i$) for the user for the next 28 days if the user is never presented with content items. Continuing with this example, the prediction module 215 may determine a predicted effect of different content item loads for the user on the net present value for the next 28 days by computing a difference between the values, such that the predicted effect is represented as: $\delta$NPV$_i$=f($\tau$=1, X$_i$)–f($\tau$=0, X$_i$). In the above example, the prediction module 215 similarly may determine a predicted effect of different content item loads for the user on additional metrics for the next 28 days, such as a gross transaction volume (GTV$_i$) and a monthly average amount the user spends on orders placed with the online system 140 (MAO$_i$), such that the predicted effects are represented as: $\delta$GTV$_i$=g($\tau$=1, X$_i$)–g($\tau$=0, X$_i$) and $\delta$MAO$_i$=h($\tau$=1, X$_i$)–h($\tau$=0, X$_i$), respectively. Continuing with the above example, the prediction module 215 also may determine a predicted effect of different content item loads for the user on additional metrics for the next 28 days, such as an amount of revenue earned by an entity (Ads_Sales$_i$) and an amount of revenue earned by the online system 140 (Ads_Revenue$_i$), such that the predicted effects are represented as: $\delta$Ads_Sales$_i$=j($\tau$=1, X$_i$)–j($\tau$=0, X$_i$) and dAds_Revenue$_i$=k($\tau$=1, X$_i$)–k($\tau$=0, X$_i$), respectively. In the above examples, a value of each function may be determined using a metric prediction model, as further described below.

The prediction module 215 may predict metrics for a user using one or more metric prediction models. A metric prediction model is a machine-learning model trained to predict a metric for a user for a future time period and a content item load for the user. For example, the prediction module 215 may use different metric prediction models to predict different metrics for a user for a future time period and a content item load for the user. In this example, each metric prediction model may predict one of the following metrics: a net present value, a gross transaction volume, a monthly average amount the user spends on orders placed with the online system 140, an amount of revenue earned by an entity, and an amount of revenue earned by the online system 140. Alternatively, in the above example, the prediction module 215 may use a single model (e.g., a single multi-headed model) to predict the metrics.

The prediction module 215 also may determine a predicted effect of different content item loads for a user on a metric for a future time period using a metric prediction model. For example, the prediction module 215 may use a metric prediction model corresponding to a single machine-learning model to predict a first value of a metric for a user for a future time period and a first content item load for the user and use the model again to predict a second value of the metric for the user for the future time period and a second content item load for the user. In this example, the prediction module 215 may then determine a predicted effect of different content item loads for the user on the metric for the future time period by computing a difference between the values. Alternatively, in the above example, the metric prediction model may be a dual machine-learning model (e.g., a causal machine-learning model) that predicts the values of the metric and computes the difference between the values, or the prediction module 215 may predict the values and compute the difference using a meta-learner.

To use a metric prediction model, the prediction module 215 may access the model (e.g., from the data store 240) and apply the model to a set of inputs. The set of inputs may include various types of information described above (e.g., a set of user data associated with a user, a set of content item data associated with a set of content items, one or more content item loads that may be associated with the user, a future time period for which a metric or an effect of different content item loads for the user on the metric is to be predicted, etc.). For example, the set of inputs may include a set of user data associated with a user, such as a set of contextual information associated with the user, demographic information associated with the user, information describing actions performed by the user, etc. In the above example, the set of inputs also may include a set of content item data associated with a set of content items having targeting criteria satisfied by the user. In this example, the set of content item data may include a value associated with each content item, such as a cost per click, a cost per impression, a click-through rate, or a budget associated with the content item, a quantity of an item associated with the content item ordered by users presented with the content item within a threshold amount of time before ordering the item, etc. In this example, the set of inputs also may include one or more content item loads that may be associated with the user (e.g., never, once per minute, once per carousel, etc.) and a future time period (e.g., the next year or the next five years) for which a metric or an effect of different content item loads for the user on the metric is to be predicted.

Once the prediction module 215 applies a metric prediction model to a set of inputs, the prediction module 215 may receive an output from the model. In embodiments in which a metric prediction model is a single machine-learning model, an output from the model corresponds to a metric predicted for a user for a future time period and a content item load for the user. For example, an output received by the prediction module 215 may include a metric predicted for a user for a future time period and a content item load for the user, such as a net present value, a gross transaction volume, a monthly engagement by the user with the online system 140, an amount of revenue earned by an entity or by the online system 140, etc. In this example, the prediction module 215 may then repeat this process to obtain another value of the metric for a different content item load for the user and determine a predicted effect of different content item loads for the user on the metric for the future time period, as described above. In embodiments in which a metric prediction model is a dual machine-learning model (e.g., a causal machine-learning model), an output from the model corresponds to a predicted effect of different content item loads for a user on a metric for a future time period. In the above example, the output alternatively may include a predicted effect of different content item loads for the user on the metric for the future time period. In some embodiments, a metric prediction model may be trained by the machine-learning training module 230, as further described below. Furthermore, once the prediction module 215 receives an output from a metric prediction model, the prediction module 215 may store the output in the data store 240.

The optimization module 216 may generate a set of optimal values for a set of users of the online system 140, in which each optimal value indicates whether a user is eligible to be presented with a set of content items. In some embodiments, the set of optimal values may correspond to an optimal tensor (e.g., a vector). For example, the optimization module 216 may generate an optimal tensor, which may be a vector with a dimension for each user included among a set of users, in which an optimal value for each user indicates whether or when a set of content items may be presented to the user. An optimal value associated with a user may be a binary value or a non-binary value. In the above example, the optimal value for each user may be binary, in which a value of 0 indicates that the user is not eligible to be presented with the set of content items and a value of 1 indicates that the user is eligible to be presented with the set of content items. Alternatively, in the above example, the optimal value for each user may be non-binary, in which the optimal value may be proportional to a sampling rate, a frequency, or any other suitable value indicating whether or when the set of content items may be presented to the user (e.g., one content item per minute, two content items per page or carousel, etc.).

The optimization module 216 may generate a set of optimal values for a set of users of the online system 140 based on various types of information. Examples of such types of information include: predicted effects of different content item loads for each user on the metrics, one or more objectives associated with the online system 140 or an entity associated with a content item, a set of constraints, or any other suitable types of information. In embodiments in which the optimization module 216 generates a set of optimal values for a set of users based on a set of constraints, the set of constraints may be received from an entity (e.g., a retailer, a business, an organization, etc.) associated with a content item or from any other suitable source. For example, if a content item corresponds to an advertisement received from a business, a constraint received from the business may correspond to a minimum return on ad spend (ROAS), a budget associated with the advertisement that cannot be exceeded, etc.

The following example illustrates how the optimization module 216 may generate a set of optimal values for a set of users. Suppose that at the level of all users of the online system 140 (indicated by the superscript T), an objective associated with the online system 140 corresponds to maximizing a predicted effect of different content item loads for the users on a gross transaction volume ($\delta GTV^T \times T$) for a future time period. In the above example, if the content items correspond to advertisements, the optimization module 216 may generate an optimal tensor (T) for the users while satisfying a constraint of staying within a budget associated with the advertisements (Total_Ads_Budget), such that an amount of revenue earned by the online system 140 for presenting the advertisements is less than or equal to the budget ($\delta$Ads Revemie$^T \times$T=Total_Ads_Budget). Continuing with the above example, suppose that an additional objective associated with the online system 140 corresponds to maximizing a predicted effect of different content item loads for the users on a net present value ($\delta NPV^T \times T$) for the future time period. In this example, the optimization module 216 may generate the optimal tensor (T) for the users while staying within the budget associated with the advertisements (Total_Ads_Budget), such that $\delta$Ads_Revenie$^T \times$ T=Total_Ads_Budget. In the above example, the online system 140 also may generate the optimal tensor (7) for the users based on an additional constraint corresponding to a minimum ROAS (c), such that $\delta$Ads_Sales$^T \times$T/$\delta$Ads_Revenue$^T \times$T>c.

The optimization module 216 may generate a set of optimal values for a set of users based on multiple objectives. In some embodiments, the optimization module 216 generates the set of optimal values in a way that achieves the objectives. In the above example, the optimization module 216 may generate the optimal tensor (T) for the users in a way that maximizes the effect of different content item loads for the users on both the gross transaction value ($\delta GTV^T \times 1$) and the net present value ($\delta NPV^T \times T$) for the future time period. In other embodiments, the optimization module 216 generates the set of optimal values by balancing the objectives. In the above example, the optimization module 216 alternatively may identify one or more weights associated with one or more of the predicted effects, such that a weight associated with a predicted effect is proportional to a priority of an associated objective. Continuing with this example, the optimization module 216 may then generate the optimal tensor (T) for the users based on the weight(s). The optimization module 216 may operate as a contextual bandit that probablistically generates different optimal values for different users. As further described below, the randomness in this process allows for continued training of the metric prediction model(s). Once the optimization module 216 generates a set of optimal values for a set of users of the online system 140, the optimization module 216 may store the set of optimal values (e.g., in the data store 240).

In some embodiments, in addition to generating a set of optimal values for a set of users, the optimization module 216 also may determine a set of additional criteria associated with the set of optimal values indicating whether each user is eligible to be presented with a set of content items. Examples of additional criteria indicating whether a user is eligible to be presented with a set of content items include: a context in which the user is eligible to be presented with the set of content items, an item associated with content items eligible to be presented to the user, a type of content item that is eligible to be presented to the user, or any other suitable types of criteria. The optimization module 216 may determine the set of additional criteria based on user data associated with a set of users, a set of content item data associated with a set of content items, one or more objectives associated with the online system 140 or an entity associated with a content item, or any other suitable types of information. For example, suppose that user data associated with a set of users indicate that each user ordered an item with at least a threshold frequency if the user was presented with a content item associated with the item while searching for the item, in which the content item was an advertisement including a coupon for the item. In this example, the optimization module 216 may determine a set of additional criteria associated with a set of optimal values generated for the set of users, in which the set of additional criteria describes a surface corresponding to a set of search results in which each user is eligible to be presented with a set of content items and a type of content item corresponding to an advertisement including a coupon that is eligible to be presented to each user. Once the optimization module 216 determines a set of additional criteria associated with a set of optimal values, the optimization module 216 may store the set of additional criteria (e.g., in the data store 240). In embodiments in which a set of optimal values corresponds to an optimal tensor with a dimension for each user, the optimal tensor includes additional dimensions describing the additional criteria.

The presentation determination module 217 identifies an opportunity to present a set of content items to a user of the online system 140. The presentation determination module 217 may do so based on a request received from a user client device 100 associated with the user. For example, suppose that the online system 140 receives a request from a user client device 100 associated with a user to present a homepage for the online system 140. In this example, the presentation determination module 217 may identify an opportunity to present a set of content items to the user if the homepage includes a display unit (e.g., a carousel, a slideshow, etc.) in which the set of content items may be presented.

Responsive to identifying an opportunity to present a set of content items to a user of the online system 140, the presentation determination module 217 determines whether the user is eligible to be presented with the set of content items. The presentation determination module 217 may do so by accessing an optimal value generated for the user by the optimization module 216 (e.g., from the data store 240) and determining whether the user is eligible to be presented with the set of content items based on the optimal value. For example, suppose that the presentation determination module 217 accesses an optimal tensor with a dimension for a user, in which an optimal value generated for the user corresponds to a binary value of 0 or 1. In this example, the presentation determination module 217 may determine that the user is eligible to be presented with a set of content items if the optimal value is 1 and that the user is not eligible to be presented with the set of content items if the optimal value is 0. Alternatively, in the above example, suppose that the optimal value generated for the user is non-binary, such that the value is proportional to a sampling rate, a frequency, or any other suitable value indicating whether or when the set of content items may be presented to the user (e.g., one content item per minute, two content items per page or carousel, etc.). In this example, the presentation determination module 217 may determine the user is eligible to be presented with the set of content items if the optimal value is at least a threshold value and that the user is not eligible to be presented with the set of content items if the optimal value is less than the threshold value.

The presentation determination module 217 also may access a set of additional criteria in association with an optimal value generated for a user and determine whether the user is eligible to be presented with a set of content items on various levels of granularity based on the set of additional criteria. For example, suppose that an optimal tensor includes a dimension describing a context in which a set of content items is eligible to be presented to a user. In this example, the presentation determination module 217 may determine whether the user is eligible to be presented with the set of content items based on an optimal value generated for the user and contextual information associated with the user when the presentation determination module 217 identified an opportunity to present the set of content items to the user. If an optimal value generated for a user is associated with a set of additional criteria indicating whether the user is eligible to be presented with a set of content items, the presentation determination module 217 also may communicate the set of additional criteria to other components of the content presentation module 210 (e.g., the identification module 214), which may identify a subset of the set of content items eligible for presentation to the user based on the set of additional criteria.

Once the presentation determination module 217 determines a user is eligible to be presented with a set of content items, the interface module 211 may send the set of content items for display to a user client device 100 associated with the user. For example, the interface module 211 may generate an interface, such as a checkout page that includes display units (e.g., a carousel or a slideshow) by populating the display units with the set of content items. In this example, the interface module 211 may then send the interface for display to the user client device 100 associated with the user.

Alternatively, various components of the content presentation module 210 may identify a subset of a set of content items eligible for presentation to a user and the interface module 211 may send the identified subset of content items for display to a user client device 100 associated with the user. For example, suppose that the presentation determination module 217 has identified an opportunity to present a set of content items to a user upon receiving a request from a user client device 100 associated with the user for a set of search results and that the presentation determination module 217 has determined that the user is eligible to be presented with the set of content items. In this example, the scoring module 212 may score the set of content items based on a search query received from the user client device 100 (e.g., based on a relatedness of each content item to the search query or based on a predicted availability of an item associated with each content item) and the ranking module 213 may rank the set of content items based on their scores (e.g., from highest to lowest). In this example, the identification module 214 may identify a subset of the set of content items with scores that exceed some threshold (e.g., the top n content items or the p percentile of content items) and the interface module 211 then sends the identified subset of content items for display to the user client device 100 associated with the user.

As described above, if an optimal value generated for a user is associated with a set of additional criteria indicating whether the user is eligible to be presented with a set of content items, the identification module 214 also may identify a subset of the set of content items for presentation to the user based on the set of additional criteria. In the above example, suppose that a set of additional criteria associated with an optimal value generated for the user describes an item associated with content items eligible to be presented to the user and a type of content item that is eligible to be presented to the user. In this example, the identification module 214 may identify the subset of the set of content items based on the set of additional criteria, such that the identified subset of content item satisfies the set of additional criteria, and the interface module 211 may send the identified subset of content items for display to the user client device 100 associated with the user.

Once the interface module 211 sends a set of content items or a subset of the set of content items for display to a user client device 100 associated with a user, the data collection module 200 may detect one or more actions associated with the set/subset of content items performed by the user. The data collection module 200 also may store information describing the action(s) among user data associated with the user (e.g., in the data store 240). Furthermore, any actions associated with the set/subset of content items detected by the data collection module 200 may be used to re-train one or more of the metric prediction models after sufficient additional training data has been acquired, as described below.

The order management module 220 manages orders for items from users. The order management module 220 receives orders from user client devices 100 and assigns the orders to pickers for service based on picker data. For example, the order management module 220 assigns an order to a picker based on the picker's location and the retailer location from which the ordered items are to be collected. The order management module 220 may also assign an order to a picker based on how many items are in the order, a vehicle operated by the picker, the delivery location, the picker's preferences for how far to travel to deliver an order, the picker's ratings by users, or how often a picker agrees to service an order.

In some embodiments, the order management module 220 determines when to assign an order to a picker based on a delivery timeframe requested by the user who placed the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online system 140. The online system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model is used by the machine-learning model to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

In embodiments in which the prediction module 215 accesses one or more metric prediction models, the machine-learning training module 230 may train the metric prediction model(s). The machine-learning training module 230 may train a metric prediction model via supervised learning or using any other suitable technique or combination of techniques. Furthermore, the machine-learning training module 230 may train a metric prediction model based on user data associated with users of the online system 140, content item data associated with content items that may be presented to users of the online system 140, or any other suitable types of data.

To illustrate an example of how a metric prediction model may be trained, suppose that the machine-learning training module 230 receives a set of training examples corresponding to randomized data, in which different users are associated with different content item loads. In this example, the set of training examples may include attributes of users, such as a content item load for each user describing a quantity of content items that were sent to a user client device 100 associated with each user or a frequency with which content items were sent to a user client device 100 associated with each user. Continuing with this example, the set of training examples also may include a set of contextual information associated with each user when a content item was sent to a user client device 100 associated with the user, demographic information associated with each user, information describing actions performed by each user, etc. In the above example, the set of training examples also may include content item data associated with various content items describing targeting criteria associated with each content item, a value associated with each content item (e.g., a cost per click or a quantity of an item associated with the content item ordered by users within a threshold amount of time of being presented with the content item), etc. Continuing with the above example, the machine-learning training module 230 also may receive labels which represent expected outputs of a metric prediction model. In the above example, if the metric prediction model is a single machine-learning model, a label may correspond to a value of a metric (e.g., a net present value, a gross transaction volume, etc.) for a user and a time period (e.g., 28 days), in which the user was associated with a particular content item load. Continuing with this example, the machine-learning training module

230 may then train the metric prediction model based on the attributes, as well as the labels by comparing its output from input data of each training example to the label for the training example. In the above example, if the metric prediction model is a dual machine-learning model (e.g., a causal machine-learning model), the set of training examples also may include observational data (e.g., information describing actions associated with content items performed by each user). In this example, the metric prediction model may then learn a relationship between the content item loads for the users and the values of the metric for the users based on the set of training examples.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In situations in which the training example includes a label, the loss function is also based on the label for the training example. Some example loss functions include the mean square error function, the mean absolute error, the hinge loss function, and the cross-entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may re-train the machine-learning model based on the actual performance of the model after the online system 140 has deployed the model to provide service to users. For example, suppose that the optimization module 216 operates as a contextual bandit that probabilistically generates different optimal values for different users, in which each optimal value for a user indicates whether the user is eligible to be presented with a set of content items. In this example, the randomness in this process allows the metric prediction model(s) to be re-trained based on observational data describing actions associated with content items subsequently performed by the users. As an additional example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, content item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

Determining User Eligibility for Content Item Presentation Based on Multiple Objective-Based Metrics FIG. 3 is a flowchart of a method for determining user eligibility for content item presentation based on multiple objective-based metrics, in accordance with one or more embodiments. Alternative embodiments may include more, fewer, or different steps from those illustrated in FIG. 3, and the steps may be performed in a different order from that illustrated in FIG. 3. These steps may be performed by an online system (e.g., online system 140), such as an online concierge system. Additionally, each of these steps may be performed automatically by the online system 140 without human intervention.

The online system 140 sends (step 305, e.g., using the interface module 211) content items for display to user client devices 100 associated with users of the online system 140. For example, the online system 140 may generate (e.g., using the interface module 211) an interface, such as an ordering interface, that includes display units (e.g., a carousel or a slideshow) by populating the display units with content items or items that users may select for adding to their order. In this example, the online system 140 may then send 305 the interface for display to a user client device 100 associated with each user.

The online system 140 then detects 310 (e.g., using the data collection module 200) one or more actions associated with one or more of the content items performed by one or more of the users. The online system 140 may detect 310 a type of each action performed by a user (e.g., clicking on a content item, placing an order including an item associated with a content item, etc.), a time (e.g., a timestamp) associated with each action, as well as one or more items, a content item, etc. associated with each action. For example, the online system 140 may detect 310 an action performed by a user associated with a content item, such as clicking on the content item, dismissing the content item (e.g., by closing or ignoring the content item), placing an order including an item associated with the content item, installing or downloading an application associated with the content item, or subscribing to a service associated with the content item. In this example, the online system 140 also may detect 310 a type of the content item (e.g., an advertisement, a coupon, a recipe, etc.) and items or other objects (e.g., videos, images, applications, etc.) associated with the content item, such as a type, a discount, a coupon, a price, etc. associated with each item/object. As yet another example, the online system 140 may detect 310 an item a user ordered within a threshold amount of time after being presented with or after clicking on a content item associated with the item. The online system 140 also may detect 310 one or more values associated with each action performed by a user (e.g., a quantity and a price of an item ordered by a user, a cost per click associated with a content item with which a user interacted, etc.) or any other suitable types of information associated with each action. The online system 140 may then store information describing the action(s) among user data associated with the user(s) (e.g., in the data store 240).

For each user included among a set of users of the online system 140, the online system 140 may then predict (e.g., using the prediction module 215) various metrics for a future time period (e.g., for the next 28 days, year, five years, etc.) and a content item load for the user. A content item load for a user may describe a quantity of content items that may be presented to the user (e.g., per surface or page) or a frequency with which content items may be presented to the user. For example, a content item load for a user may correspond to never, once per minute, twice per page, etc. A content item load for a user may be determined (e.g., using a machine-learning model) each time the online system 140 identifies (e.g., using the presentation determination module 217) an opportunity to present a set of content items to the user. Alternatively, a content item load for a user may be determined on a different basis (e.g., daily) and stored (e.g., in the data store 240) on the same or a similar basis. The metrics may be associated with objectives of the online system 140 or an entity associated with a content item, such as a retailer, a business, or an organization from which the content item was received. Furthermore, the metrics may describe a growth of the online system 140, user satisfaction with the online system 140, user retention, an amount of revenue earned by the online system 140, an amount of revenue earned by an entity (e.g., attributed or incremental ads sales), or any other suitable types of information. For example, the online system 140 may predict various metrics for a user for a future time period (e.g., the next year) and a content item load for the user describing a quantity of content items that may be presented to the user or a frequency with which content items may be presented to the user (e.g., a rate of once every five minutes). In this example, the metrics may be associated with one or more objectives of the online system 140 (e.g., maximizing growth of the online system 140, maximizing user satisfaction with the online system 140, etc.) and may include proxies for growth of the online system 140 (e.g., a net present value, a gross transaction volume, or a monthly engagement for the user). Continuing with this example, the metrics also may be associated with a revenue-based objective of an entity and may include an amount of revenue earned by the entity from orders or purchases of items associated with the entity by the user. In the above example, the metrics further may be associated with a revenue-based objective of the online system 140 and may include an amount of revenue earned by the online system 140 from presenting content items to the user (e.g., based on a cost per click or a cost per impression associated with each content item, from commissions for items associated with the content items ordered or purchased by the user, etc.).

The online system 140 may predict metrics for each user included among the set of users based on various types of information, such as a set of user data associated with the user, a future time period for which the metrics are to be predicted, or any other suitable types of information. Furthermore, the set of user data associated with the user may include a content item load for the user, contextual information associated with the user, or any other suitable types of user data. For example, suppose that user data associated with users include a content item load for each user describing a quantity of content items that were sent 305 to a user client device 100 associated with each user or a frequency with which content items were sent 305 to a user client device 100 associated with each user (e.g., never, once per minute, once per set of search results, etc.). In the above example, suppose also that user data associated with the users include contextual information associated with each user when the content items were sent 305 to a user client device 100 associated with each user (e.g., a time of day, a set of surfaces or pages accessed by the user, a set of items included in a shopping list associated with the user, etc.). In this example, suppose also that the user data include demographic information associated with each user and information describing actions performed by each user (e.g., adding items to a shopping list, searching for items, browsing items, placing orders with the online system 140, etc.). Continuing with this example, via extrapolation, the online system 140 may predict metrics for a user for a future time period and a content item load for the user (e.g., a number of content items presented per set of search results). In this example, the online system 140 may predict the metrics based on a set of the user data associated with a set of users having at least a threshold measure of similarity to the user (e.g., similar preferences and demographic information), in which the set of users were associated with the same or a similar content item load. In the above example, the metrics may include a net present value, a gross transaction volume, a monthly engagement by the user with the online system 140, etc.

The online system 140 also may predict metrics for each user included among the set of users based on additional types of information, such as a set of content item data associated with content items that may be presented to the user or any other suitable types of information. In the above example, suppose also that content item data associated with content items describe targeting criteria associated with each content item, a value associated with each content item, such as a cost per click, a cost per impression, a click-through rate, or a budget associated with the content item, or a quantity of an item associated with the content item ordered by users presented with the content item within a threshold amount of time before ordering the item. Continuing with this example, via extrapolation, the online system 140 also may predict additional metrics for the user for the future time period and the content item load for the user based on a set of the content item data. In the above example, the set of content item data may be associated with a set of content items having targeting criteria satisfied by the user, in which the set of content items were presented to the set of users having at least a threshold measure of similarity to the user (e.g., similar preferences and demographic information) and the set of users were associated with the same or a similar content item load. In the above example, the additional metrics may include an amount of revenue earned by the online system 140 or by an entity associated with the set of content items.

For each user included among the set of users, the online system 140 also may determine (e.g., using the prediction module 215) a predicted effect of different content item loads for the user (e.g., presenting different quantities of content items to the user or presenting content items to the user with different frequencies) on a metric for a future time period. The online system 140 may do so by computing a difference between values of the metric predicted for the user for the future time period. For example, suppose that, at the level of individual users (indicated by the subscript i), the online system 140 has predicted a first net present value $(NPV_i)$ for a user associated with user data $(X_i)$, such as demographic information, contextual information, etc., for the next 28 days and a content item load (r) for the user that is at least a threshold (e.g., at least three content items per set of search results). In this example, suppose that the online system 140 has also predicted a second net present value $(NPV_i)$ for the user for the next 28 days if the user is never presented with content items. Continuing with this example, the online system 140 may determine a predicted effect of different content item loads for the user on the net present value for the next 28 days by computing a difference between the values, such that the predicted effect is represented as: $\delta NPV_i = f(\tau=1, X_i) - f(\tau=0, X_i)$. In the above example, the online system 140 similarly may determine a predicted effect of different content item loads for the user on additional metrics for the next 28 days, such as a gross transaction volume $(GTV_i)$ and a monthly average amount the user spends on orders placed with the online system 140 $(MAO_i)$, such that the predicted effects are represented as: $\delta GTV_i = g(\tau=1, X_i) - g(t=0, X_i)$ and $\delta MAO_i = h(\tau=1, X_i) - h(\tau=0, X_i)$, respectively. Continuing with the above example, the online system 140 also may determine a predicted effect of different content item loads for the user on additional metrics for the next 28 days, such as an amount of revenue earned by an entity $(Ads\_Sales_i)$ and an amount of revenue earned by the online system 140 $(Ads\_Revenue_i)$, such that the predicted effects are represented as: $dAds\_Sales_i = j(\tau=1, X_i) - j(\tau=0, X_i)$ and $\delta Ads\_Revenue_i = k(\tau=1, X_i) - k(\tau=0, X_i)$, respectively. In the above examples, a value of each function may be determined using a metric prediction model, as further described below.

The online system 140 may predict metrics for a user using one or more metric prediction models. A metric prediction model is a machine-learning model trained to predict a metric for a user for a future time period and a content item load for the user. For example, the online system 140 may use different metric prediction models to predict different metrics for a user for a future time period and a content item load for the user. In this example, each metric prediction model may predict one of the following metrics: a net present value, a gross transaction volume, a monthly average amount the user spends on orders placed with the online system 140, an amount of revenue earned by an entity, and an amount of revenue earned by the online system 140. Alternatively, in the above example, the online system 140 may use a single model (e.g., a single multi-headed model) to predict the metrics.

The online system 140 also may determine a predicted effect of different content item loads for a user on a metric for a future time period using a metric prediction model. For example, the online system 140 may use a metric prediction model corresponding to a single machine-learning model to predict a first value of a metric for a user for a future time period and a first content item load for the user and use the model again to predict a second value of the metric for the user for the future time period and a second content item load for the user. In this example, the online system 140 may then determine a predicted effect of different content item loads for the user on the metric for the future time period by computing (e.g., using the prediction module 215) a difference between the values. Alternatively, in the above example, the metric prediction model may be a dual machine-learning model (e.g., a causal machine-learning model) that predicts the values of the metric and computes the difference between the values, or the online system 140 may predict the values and compute the difference using a meta-learner.

Figure 4:
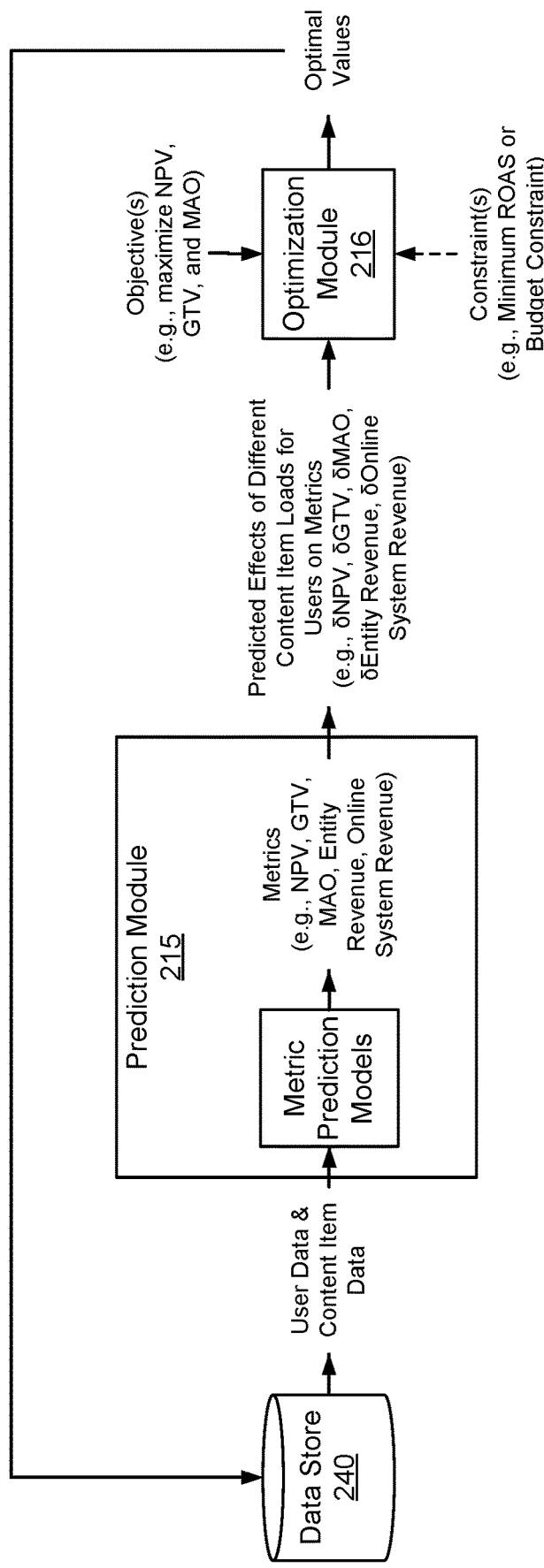
FIG. 4 is a process flow diagram for determining user eligibility for content item presentation based on multiple objective-based metrics, in accordance with one or more embodiments.

To use the metric prediction models, the online system 140 may access 315 (e.g., using the prediction module 215) the models (e.g., from the data store 240) and, for each user included among the set of users, apply 320 (e.g., using the prediction module 215) each model to a set of inputs. The set of inputs may include various types of information described above (e.g., a set of user data associated with each user, a set of content item data associated with a set of content items, one or more content item loads that may be associated with each user, a future time period for which a metric or an effect of different content item loads for each user is to be predicted, etc.). FIG. 4 is a process flow diagram for determining user eligibility for content item presentation based on multiple objective-based metrics, in accordance with one or more embodiments. As shown in FIG. 4, the set of inputs may include a set of user data associated with each user and a set of content item data associated with a set of content items having targeting criteria satisfied by the user. In this example, the set of user data associated with each user may include a set of contextual information associated with the user, demographic information associated with the user, information describing actions performed by the user, etc. In the above example, the set of content item data may include a value associated with each content item, such as a cost per click, a cost per impression, a click-through rate, or a budget associated with the content item, a quantity of an item associated with the content item ordered by users presented with the content item within a threshold amount of time before ordering the item, etc. In this example, the set of inputs also may include one or more content item loads that may be associated with the user (e.g., never, once per minute, once per carousel, etc.) and a future time period (e.g., the next year or the next five years) for which a metric or an effect of different content item loads for the user on the metric is to be predicted.

Once the online system 140 applies 320 each metric prediction model to the set of inputs, the online system 140 may receive (e.g., via the prediction module 215) an output from the model. In embodiments in which a metric prediction model is a single machine-learning model, an output from the model corresponds to a metric predicted for a user for a future time period and a content item load for the user. As shown in the example of FIG. 4, an output received by the online system 140 may include a metric predicted for a user for a future time period and a content item load for the user, such as a net present value (NPV), a gross transaction volume (GTV), a monthly engagement by the user with the online system 140 (MAO), an amount of revenue earned by an entity or by the online system 140, etc. As also shown in FIG. 4, the online system 140 may then repeat this process to obtain another value of the metric for a different content item load for the user and determine a predicted effect of different content item loads for the user on the metric for the future time period, as described above. In embodiments in which a metric prediction model is a dual machine-learning model (e.g., a causal machine-learning model), an output from the model corresponds to a predicted effect of different content item loads for a user on a metric for a future time period. In the above example, the output alternatively may include a predicted effect of different content item loads for the user on the metric for the future time period. Once the online system 140 receives an output from a metric prediction model, the online system 140 may store (e.g., using prediction module 215) the output (e.g., in the data store 240).

In some embodiments, one or more metric prediction models may be trained by the online system 140 (e.g., using the machine-learning training module 230). The online system 140 may train a metric prediction model via supervised learning or using any other suitable technique or combination of techniques. Furthermore, the online system 140 may train a metric prediction model based on user data associated with users of the online system 140, content item data associated with content items that may be presented to users of the online system 140, or any other suitable types of data.

To illustrate an example of how a metric prediction model may be trained, suppose that the online system 140 receives a set of training examples corresponding to randomized data, in which different users are associated with different content item loads. In this example, the set of training examples may include attributes of users, such as a content item load for each user describing a quantity of content items that were sent 305 to a user client device 100 associated with each user or a frequency with which content items were sent 305 to a user client device 100 associated with each user. Continuing with this example, the set of training examples also may include a set of contextual information associated with each user when a content item was sent 305 to a user client device 100 associated with the user, demographic information associated with each user, information describing actions performed by each user, etc. In the above example, the set of training examples also may include content item data associated with various content items describing targeting criteria associated with each content item, a value associated with each content item (e.g., a cost per click or a quantity of an item associated with the content item ordered by users within a threshold amount of time of being presented with the content item), etc. Continuing with the above example, the online system 140 also may receive labels which represent expected outputs of a metric prediction model. In the above example, if the metric prediction model is a single machine-learning model, a label may correspond to a value of a metric (e.g., a net present value, a gross transaction volume, etc.) for a user and a time period (e.g., 28 days), in which the user was associated with a particular content item load. Continuing with this example, the online system 140 may then train the metric prediction model based on the attributes, as well as the labels by comparing its output from input data of each training example to the label for the training example. In the above example, if the metric prediction model is a dual machine-learning model (e.g., a causal machine-learning model), the set of training examples also may include observational data (e.g., information describing actions associated with content items performed by each user). In this example, the metric prediction model may then learn a relationship between the content item loads for the users and the values of the metric for the users based on the set of training examples.

In one or more embodiments, the online system 140 may re-train (e.g., using the machine-learning training module 230) one or more of the metric prediction models based on the actual performance of the model(s) after the online system 140 has deployed the model(s) to provide service to users. For example, suppose that the online system 140 operates as a contextual bandit that probablistically generates different optimal values for different users, in which each optimal value for a user indicates whether the user is eligible to be presented with a set of content items. In this example, the randomness in this process allows the metric prediction model(s) to be re-trained based on observational data describing actions associated with content items subsequently performed by the users.

Referring back to FIG. 3, the online system 140 then generates 325 (e.g., using the optimization module 216) a set of optimal values for the set of users, in which each optimal value indicates whether a user is eligible to be presented with a set of content items. In some embodiments, the set of optimal values may correspond to an optimal tensor (e.g., a vector). For example, the online system 140 may generate 325 an optimal tensor, which may be a vector with a dimension for each user included among the set of users, in which an optimal value for each user indicates whether or when the set of content items may be presented to the user. An optimal value associated with a user may be a binary value or a non-binary value, as shown in FIGS. 5A and 5B, which illustrate examples of a set of optimal values indicating an eligibility of each of a set of users to be presented with a set of content items, in accordance with one or more embodiments. Referring first to FIG. 5A, the optimal value 510A for each user 505 may be binary, in which a value of 0 indicates that the user (505B or 505C) is not eligible to be presented with the set of content items and a value of 1 indicates that the user (505A or 505D) is eligible to be presented with the set of content items. Alternatively, as shown in FIG. 5B, the optimal value 510B for each user 505 may be non-binary, in which the optimal value 510B may be proportional to a sampling rate, a frequency, or any other suitable value indicating whether or when the set of content items may be presented to the user 505. In this example, the optimal values 510B of 0.94 and 0.47 for user 505A and user 505B, respectively, indicate that user 505A is eligible to be presented with the set of content items based on a sampling rate or with a frequency twice that of user 505B.

The online system 140 may generate 325 the set of optimal values 510 for the set of users 505 based on various types of information. As shown in the example of FIG. 4, such types of information may include: predicted effects of different content item loads for each user 505 on the metrics, one or more objectives associated with the online system 140 or an entity associated with a content item, a set of constraints, or any other suitable types of information. In embodiments in which the online system 140 generates 325 the set of optimal values 510 for the set of users 505 based on a set of constraints, the set of constraints may be received from an entity (e.g., a retailer, a business, an organization, etc.) associated with a content item or from any other suitable source. For example, if a content item corresponds to an advertisement received from a business, a constraint received from the business may correspond to a minimum return on ad spend (ROAS), a budget associated with the advertisement that cannot be exceeded, etc.

The following example illustrates how the online system 140 may generate 325 the set of optimal values 510 for the set of users 505. Suppose that at the level of all users 505 of the online system 140 (indicated by the superscript T), an objective associated with the online system 140 corresponds to maximizing a predicted effect of different content item loads for the users 505 on a gross transaction volume ($\delta GTV^T \times T$) for a future time period. In the above example, if the content items correspond to advertisements, the online system 140 may generate 325 an optimal tensor (T) for the users 505 while satisfying a constraint of staying within a budget associated with the advertisements (Total_Ads_Budget), such that an amount of revenue earned by the online system 140 for presenting the advertisements is less than or equal to the budget ($\delta$Ads_Revenue$^T \times$ T=Total_Ads_Budget). Continuing with the above example, suppose that an additional objective associated with the online system 140 corresponds to maximizing a predicted effect of different content item loads for the users 505 on a net present value ($\delta NPV^T \times T$) for the future time period. In this example, the online system 140 may generate 325 the optimal tensor (T) for the users 505 while staying within the budget associated with the advertisements (Total_Ads_Budget), such that $\delta$Ads_Revenue$^T \times$T=Total_Ads_Budget. In the above example, the online system 140 also may generate 325 the optimal tensor (T) for the users 505 based on an additional constraint corresponding to a minimum ROAS (c), such that $\delta$Ads_Sales$^T \times$T/$\delta$Ads_Revenue$^T \times$T>c.

The online system 140 may generate 325 the set of optimal values 510 for the set of users 505 based on multiple objectives. In some embodiments, the online system 140 generates 325 the set of optimal values 510 in a way that achieves the objectives. In the above example, the online system 140 may generate 325 the optimal tensor (T) for the users 505 in a way that maximizes the effect of different content item loads for the users 505 on both the gross transaction value ($\delta GTV^T \times 7$) and the net present value ($\delta NPV^T \times T$) for the future time period. In other embodiments, the online system 140 generates 325 the set of optimal values 510 by balancing the objectives. In the above example, the online system 140 alternatively may identify (e.g., using the optimization module 216) one or more weights associated with one or more of the predicted effects, such that a weight associated with a predicted effect is proportional to a priority of an associated objective. Continuing with this example, the online system 140 may then generate 325 the optimal tensor (T) for the users 505 based on the weight(s). The online system 140 may operate as a contextual bandit that probablistically generates 325 different optimal values 510 for different users 505. As further described above, the randomness in this process allows for continued training of the metric prediction model(s). Once the online system 140 generates 325 the set of optimal values 510 for the set of users 505, the online system 140 may store 330 (e.g., using the optimization module 216) the set of optimal values 510 (e.g., in the data store 240), as shown in FIG. 3.

In some embodiments, in addition to generating 325 the set of optimal values 510 for the set of users 505, the online system 140 also may determine (e.g., using the optimization module 216) a set of additional criteria associated with the set of optimal values 510 indicating whether each user 505 is eligible to be presented with the set of content items. Examples of additional criteria indicating whether a user 505 is eligible to be presented with the set of content items include: a context in which the user 505 is eligible to be presented with the set of content items, an item associated with content items eligible to be presented to the user 505, a type of content item that is eligible to be presented to the user 505, or any other suitable types of criteria. The online system 140 may determine the set of additional criteria based on user data associated with the set of users 505, a set of content item data associated with the set of content items, one or more objectives associated with the online system 140 or an entity associated with a content item, or any other suitable types of information. For example, suppose that user data associated with the set of users 505 indicate that each user 505 ordered an item with at least a threshold frequency if the user 505 was presented with a content item associated with the item while searching for the item, in which the content item was an advertisement including a coupon for the item. In this example, the online system 140 may determine the set of additional criteria associated with the set of optimal values 510 generated 325 for the set of users 505, in which the set of additional criteria describes a surface corresponding to a set of search results in which each user 505 is eligible to be presented with the set of content items and a type of content item corresponding to an advertisement including a coupon that is eligible to be presented to each user 505. Once the online system 140 determines the set of additional criteria associated with the set of optimal values 510, the online system 140 may store (e.g., using the optimization module 216) the set of additional criteria (e.g., in the data store 240). In embodiments in which the set of optimal values 510 corresponds to an optimal tensor with a dimension for each user 505, the optimal tensor includes additional dimensions describing the additional criteria.

The online system 140 may then identify 335 (e.g., using the presentation determination module 217) an opportunity to present the set of content items to a user 505 included among the set of users 505. The online system 140 may do so based on a request received from a user client device 100 associated with the user 505. For example, suppose that the online system 140 receives a request from the user client device 100 associated with the user 505 to present a homepage for the online system 140. In this example, the online system 140 may identify 335 an opportunity to present the set of content items to the user 505 if the homepage includes a display unit (e.g., a carousel, a slideshow, etc.) in which the set of content items may be presented.

Responsive to identifying 335 the opportunity to present the set of content items to the user 505, the online system 140 accesses 340 (e.g., using the presentation determination module 217) an optimal value 510 generated 325 for the user 505 (e.g., from the data store 240) and determines 345 (e.g., using the presentation determination module 217) whether the user 505 is eligible to be presented with the set of content items. The online system 140 may determine 345 whether the user 505 is eligible to be presented with the set of content items based on the optimal value 510. For example, suppose that the online system 140 accesses 340 an optimal tensor with a dimension for the user 505, in which an optimal value 510 generated 325 for the user 505 corresponds to a binary value of 0 or 1. In this example, the online system 140 may determine 345 that the user 505 is eligible to be presented with the set of content items if the optimal value 510 is 1 and that the user 505 is not eligible to be presented with the set of content items if the optimal value 510 is 0. Alternatively, in the above example, suppose that the optimal value 510 generated 325 for the user 505 is non-binary, such that the value is proportional to a sampling rate, a frequency, or any other suitable value indicating whether or when the set of content items may be presented to the user 505 (e.g., one content item per minute, two content items per page or carousel, etc.). In this example, the online system 140 may determine 345 the user 505 is eligible to be presented with the set of content items if the optimal value 510 is at least a threshold value and that the user 505 is not eligible to be presented with the set of content items if the optimal value 510 is less than the threshold value.

The online system 140 also may access (e.g., using the presentation determination module 217) a set of additional criteria in association with the optimal value 510 generated 325 for the user 505 and determine 345 whether the user 505 is eligible to be presented with the set of content items on various levels of granularity based on the set of additional criteria. For example, suppose that an optimal tensor includes a dimension describing a context in which the set of content items is eligible to be presented to the user 505. In this example, the online system 140 may determine 345 whether the user 505 is eligible to be presented with the set of content items based on the optimal value 510 generated 325 for the user 505 and contextual information associated with the user 505 when the online system 140 identified 335 the opportunity to present the set of content items to the user 505. If the online system 140 determines 345 that the user 505 is not eligible to be presented with the set of content items, the online system 140 may repeat some of the steps described above (e.g., by proceeding back to the accessing 315 the metric prediction models step or the identifying 335 an opportunity to present the set of content items to a user step, etc.).

Responsive to determining 345 the user 505 is eligible to be presented with the set of content items, the online system 140 may send 350 (e.g., using the interface module 211) the set of content items for display to the user client device 100 associated with the user 505. For example, the online system 140 may generate (e.g., using the interface module 211) an interface, such as a checkout page that includes display units (e.g., a carousel or a slideshow) by populating the display units with the set of content items. In this example, the online system 140 may then send 350 the interface for display to the user client device 100 associated with the user 505.

Alternatively, the online system 140 may identify a subset of the set of content items eligible for presentation to the user 505 and the online system 140 may send 350 the identified subset of content items for display to the user client device 100 associated with the user 505. For example, suppose that the online system 140 has identified 335 an opportunity to present the set of content items to the user 505 upon receiving a request from the user client device 100 associated with the user 505 for a set of search results and that the online system 140 has determined 345 that the user 505 is eligible to be presented with the set of content items. In this example, the online system 140 may score (e.g., using the scoring module 212) the set of content items based on a search query received from the user client device 100 (e.g., based on a relatedness of each content item to the search query or based on a predicted availability of an item associated with each content item) and the online system 140 may rank (e.g., using the ranking module 213) the set of content items based on their scores (e.g., from highest to lowest). In this example, the online system 140 may identify (e.g., using the identification module 214) a subset of the set of content items with scores that exceed some threshold (e.g., the top n content items or the p percentile of content items) and the online system 140 then sends 350 the identified subset of content items for display to the user client device 100.

As described above, if the optimal value 510 generated 325 for the user 505 is associated with a set of additional criteria indicating whether the user 505 is eligible to be presented with the set of content items, the online system 140 also may identify (e.g., using the identification module 214) a subset of the set of content items for presentation to the user 505 based on the set of additional criteria. In the above example, suppose that a set of additional criteria associated with the optimal value 510 generated 325 for the user 505 describes an item associated with content items eligible to be presented to the user 505 and a type of content item that is eligible to be presented to the user 505. In this example, the online system 140 may identify the subset of the set of content items based on the set of additional criteria, such that the identified subset of content items satisfies the set of additional criteria, and the online system 140 may send 350 the identified subset of content items for display to the user client device 100 associated with the user 505.

Once the online system 140 sends 350 the set of content items or the subset of the set of content items for display to the user client device 100 associated with the user 505, the online system 140 may detect 310 one or more actions associated with the set/subset of content items performed by the user 505. The online system 140 also may store information describing the action(s) among user data associated with the user 505 (e.g., in the data store 240). Furthermore, any actions associated with the set/subset of content items detected 310 by the online system 140 may be used to re-train (e.g., using the machine-learning training module 230) one or more of the metric prediction models after sufficient additional training data has been acquired.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:

sending a plurality of content items for display to a plurality of devices associated with a plurality of users of an online system;

detecting one or more actions, associated with one or more content items of the plurality of content items, performed by one or more users of the plurality of users;

accessing a plurality of machine-learning models trained to predict, for a user of the online system, a plurality of metrics associated with a plurality of objectives, the plurality of objectives associated with the online system or an entity associated with a content item, wherein each machine-learning model of the plurality of machine-learning models is trained by:

receiving user data associated with the plurality of users, receiving, for each of the plurality of users, a label corresponding to a value of a corresponding metric for each of the plurality of users, applying each machine-learning model to the user data to generate an output including a second value of the corresponding metric for each of the plurality of users, comparing the output to the label, and updating, based on comparing the output to the label, a set of parameters of each machine-learning model;

for each user of a set of users, applying the plurality of machine-learning models to a set of user data associated with each user of the set of users, a set of content item data associated with a set of content items, a frequency of presenting the set of content items to each user of the set of users, and an indication about a future time period for which each metric of the plurality of metrics is to be predicted to generate a plurality of values of the plurality of metrics for the future time period for each user of the set of users and a content item load indicative of a quantity of content items to be potentially presented per page of a user interface of a device associated with each user of the set of users, a different machine-learning model of the plurality of machine-learning models generating a value of the plurality of values of a different metric of the plurality of metrics or the content item load;

generating a set of optimal values for the set of users based at least in part on the plurality of values of the plurality of metrics for the future time period generated for each user of the set of users, one or more objectives of the plurality of objectives, and a set of constraints, wherein each optimal value of the set of optimal values indicates whether a user of the set of users is eligible to be presented with the set of content items;

storing the set of optimal values;

responsive to identifying an opportunity to present the set of content items to a user of the set of users, accessing an optimal value from the set of optimal values that is generated for the user;

determining, using information about the set of content items and information about the set of users, a set of additional criteria associated with the set of optimal values, each of the set of additional criteria indicating a context in which each user from the set of users is eligible to be presented with the set of content items;

generating a tensor for the set of users by including into the tensor the set of optimal values and the set of additional criteria, the tensor including, for each user from the set of users, a first dimension storing a respective optimal value from the set of optimal values and a second dimension storing an indication describing the context in which the set of content items is eligible to be presented to each user;

accessing the optimal value for the user and one of the set of additional criteria for the user by accessing corresponding first and second dimensions of the tensor that are associated with the user;

determining, using the accessed optimal value and the accessed one of the set of additional criteria, that the user is eligible to be presented with the set of content items; and responsive to determining that the user is eligible to be presented with the set of content items, sending information about the set of content items and information about the content item load to a device associated with the user, wherein the sending causes a user interface of the device associated with the user to display the set of content items such that each page of the user interface displays the quantity of content items from the set of content items.

2. The method of claim 1, wherein applying the plurality of machine-learning models to generate the plurality of values of the plurality of metrics comprises applying the plurality of machine-learning models to generate one or more of: a net present value associated with the online system, a gross transaction value associated with the online system, an amount of user engagement with the online system, an amount of revenue associated with an entity attributed to content items presented to users of the online system, or an amount of revenue associated with the online system for presenting content items to users of the online system.

3. The method of claim 1, wherein generating the set of optimal values for the set of users based at least in part on the set of constraints comprises generating the set of optimal values for the set of users based at least in part on one or more of: a budget associated with an entity or a threshold ratio of an amount of revenue associated with an entity attributed to content items presented to users of the online system to an amount of revenue associated with the online system for presenting content items to users of the online system.

4. The method of claim 1, wherein receiving the user data associated with the plurality of users comprises receiving a context in which a content item was presented to the user, wherein the context comprises one or more of: a surface in which the content item was presented or a time during which the content item was presented.

5. The method of claim 1, further comprising:

detecting one or more additional actions associated with one or more content items of the set of content items performed by the user; and re-training the plurality of machine-learning models based at least in part on the one or more additional actions.

6. The method of claim 1, wherein training each machine-learning model of the plurality of machine-learning models is further based at least in part on content item data associated with the plurality of content items, the content item data comprising one or more of: one or more attributes of an item associated with a content item and a type of the content item.

7. The method of claim 6, wherein applying the plurality of machine-learning models to generate the plurality of values of the plurality of metrics is further based at least in part on a set of content item data associated with the content item eligible to be presented to each user of the plurality of users.

8. The method of claim 1, wherein generating the set of optimal values for the set of users is further based at least in part on a weight associated with a metric of the plurality of metrics, wherein the weight is identified based at least in part on one or more objectives of the plurality of objectives.

9. The method of claim 1, wherein the plurality of machine-learning models comprises a set of single machine-learning models and a set of dual machine-learning models, a subset of the set of single machine-learning models comprising a multi-headed model.

10. The method of claim 1, wherein generating the set of optimal values for the set of users comprises generating one or more of: a binary value indicative of whether the user is eligible to be presented with the set of content items or a non-binary value proportional to a rate or a frequency at which the set of content items are to be presented to the user.

11. A computer program product comprising a non-transitory computer-readable storage medium having instructions encoded thereon that, when executed by a processor, cause the processor to perform steps comprising:

sending a plurality of content items for display to a plurality of devices associated with a plurality of users of an online system;

detecting one or more actions, associated with one or more content items of the plurality of content items, performed by one or more users of the plurality of users;

accessing a plurality of machine-learning models trained to predict, for a user of the online system, a plurality of metrics associated with a plurality of objectives, the plurality of objectives associated with the online system or an entity associated with a content item, wherein each machine-learning model of the plurality of machine-learning models is trained by:

receiving user data associated with the plurality of users, receiving, for each of the plurality of users, a label corresponding to a value of a corresponding metric for each of the plurality of users, applying each machine-learning model to the user data to generate an output including a second value of the corresponding metric for each of the plurality of users, comparing the output to the label, and updating, based on comparing the output to the label, a set of parameters of each machine-learning model;

for each user of a set of users, applying the plurality of machine-learning models to a set of user data associated with each user of the set of users, a set of content item data associated with a set of content items, a frequency of presenting the set of content items to each user of the set of users, and an indication about a future time period for which each metric of the plurality of metrics is to be predicted to generate a plurality of values of the plurality of metrics for the future time period for each user of the set of users and a content item load indicative of a quantity of content items to be potentially presented per page of a user interface of a device associated with each user of the set of users, a different machine-learning model of the plurality of machine-learning models generating a value of the plurality of values of a different metric of the plurality of metrics or the content item load;

generating a set of optimal values for the set of users based at least in part on the plurality of values of the plurality of metrics for the future time period generated for each user of the set of users, one or more objectives of the plurality of objectives, and a set of constraints, wherein each optimal value of the set of optimal values indicates whether a user of the set of users is eligible to be presented with the set of content items;

storing the set of optimal values;

responsive to identifying an opportunity to present the set of content items to a user of the set of users, accessing an optimal value from the set of optimal values that is generated for the user;

determining, using information about the set of content items and information about the set of users, a set of additional criteria associated with the set of optimal values, each of the set of additional criteria indicating a context in which each user from the set of users is eligible to be presented with the set of content items;

generating a tensor for the set of users by including into the tensor the set of optimal values and the set of additional criteria, the tensor including, for each user from the set of users, a first dimension storing a respective optimal value from the set of optimal values and a second dimension storing an indication describing the context in which the set of content items is eligible to be presented to each user;

accessing the optimal value for the user and one of the set of additional criteria for the user by accessing corresponding first and second dimensions of the tensor that are associated with the user;

determining, using the accessed optimal value and the accessed one of the set of additional criteria, that the user is eligible to be presented with the set of content items; and responsive to determining that the user is eligible to be presented with the set of content items, sending information about the set of content items and information about the content item load to a device associated with the user, wherein the sending causes a user interface of the device associated with the user to display the set of content items such that each page of the user interface displays the quantity of content items from the set of content items.

12. The computer program product of claim 11, wherein generating the set of optimal values for the set of users based at least in part on the set of constraints comprises generating the set of optimal values for the set of users based at least in part on one or more of: a budget associated with an entity or a threshold ratio of an amount of revenue associated with an entity attributed to content items presented to users of the online system to an amount of revenue associated with the online system for presenting content items to users of the online system.

13. The computer program product of claim 11, wherein receiving the user data associated with the plurality of users comprises receiving a context in which a content item was presented to the user, wherein the context comprises one or more of: a surface in which the content item was presented or a time during which the content item was presented.

14. The computer program product of claim 11, wherein the non-transitory computer-readable storage medium further has instructions encoded thereon that, when executed by the processor, cause the processor to perform steps comprising:

detecting one or more additional actions associated with one or more content items of the set of content items performed by the user; and re-training the plurality of machine-learning models based at least in part on the one or more additional actions.

15. The computer program product of claim 11, wherein training each machine-learning model of the plurality of machine-learning models is further based at least in part on content item data associated with the plurality of content items, the content item data comprising one or more of: one or more attributes of an item associated with a content item and a type of the content item.

16. The computer program product of claim 15, wherein applying the plurality of machine-learning models to generate the plurality of values of the plurality of metrics is further based at least in part on a set of content item data associated with the content item eligible to be presented to each user of the plurality of users.

17. The computer program product of claim 11, wherein the plurality of machine-learning models comprises a set of single machine-learning models and a set of dual machine-learning models, a subset of the set of single machine-learning models comprising a multi-headed model.

18. A computer system comprising:

a processor; and a non-transitory computer-readable storage medium storing instructions that, when executed by the processor, perform actions comprising:

sending a plurality of content items for display to a plurality of devices associated with a plurality of users of an online system;

detecting one or more actions, associated with one or more content items of the plurality of content items, performed by one or more users of the plurality of users;

accessing a plurality of machine-learning models trained to predict, for a user of the online system, a plurality of metrics associated with a plurality of objectives, the plurality of objectives associated with the online system or an entity associated with a content item, wherein each machine-learning model of the plurality of machine-learning models is trained by:

receiving user data associated with the plurality of users, receiving, for each of the plurality of users, a label corresponding to a value of a corresponding metric for each of the plurality of users, applying each machine-learning model to the user data to generate an output including a second value of the corresponding metric for each of the plurality of users, comparing the output to the label, and updating, based on comparing the output to the label, a set of parameters of each machine-learning model;

for each user of a set of users, applying the plurality of machine-learning models to a set of user data associated with each user of the set of users, a set of content item data associated with a set of content items, a frequency of presenting the set of content items to each user of the set of users, and an indication about a future time period for which each metric of the plurality of metrics is to be predicted to generate a plurality of values of the plurality of metrics for the future time period for each user of the set of users and a content item load indicative of a quantity of content items to be potentially presented per page of a user interface of a device associated with each user of the set of users, a different machine-learning model of the plurality of machine-learning models generating a value of the plurality of values of a different metric of the plurality of metrics or the content item load;

generating a set of optimal values for the set of users based at least in part on the plurality of values of the plurality of metrics for the future time period generated for each user of the set of users, one or more objectives of the plurality of objectives, and a set of constraints, wherein each optimal value of the set of optimal values indicates whether a user of the set of users is eligible to be presented with the set of content items;

storing the set of optimal values;

responsive to identifying an opportunity to present the set of content items to a user of the set of users, accessing an optimal value from the set of optimal values that is generated for the user;

determining, using information about the set of content items and information about the set of users, a set of additional criteria associated with the set of optimal values, each of the set of additional criteria indicating a context in which each user from the set of users is eligible to be presented with the set of content items;

generating a tensor for the set of users by including into the tensor the set of optimal values and the set of additional criteria, the tensor including, for each user from the set of users, a first dimension storing a respective optimal value from the set of optimal values and a second dimension storing an indication describing the context in which the set of content items is eligible to be presented to each user;

accessing the optimal value for the user and one of the set of additional criteria for the user by accessing corresponding first and second dimensions of the tensor that are associated with the user;

determining, using the accessed optimal value and the accessed one of the set of additional criteria, that the user is eligible to be presented with the set of content items; and responsive to determining that the user is eligible to be presented with the set of content items, sending information about the set of content items and information about the content item load to a device associated with the user, wherein the sending causes a user interface of the device associated with the user to display the set of content items such that each page of the user interface displays the quantity of content items from the set of content items.

* * * * *